(12) United States Patent
Lee et al.

(10) Patent No.: US 12,166,229 B2
(45) Date of Patent: Dec. 10, 2024

(54) SECONDARY BATTERY MODULE

(71) Applicant: LG ENERGY SOLUTION, LTD., Seoul (KR)

(72) Inventors: Bum Hee Lee, Daejeon (KR); Ui Seong Kim, Daejeon (KR); Tae Wan Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/294,519

(22) PCT Filed: Nov. 11, 2022

(86) PCT No.: PCT/KR2022/017775
§ 371 (c)(1),
(2) Date: Feb. 1, 2024

(87) PCT Pub. No.: WO2023/191226
PCT Pub. Date: Oct. 5, 2023

(65) Prior Publication Data
US 2024/0332715 A1    Oct. 3, 2024

(30) Foreign Application Priority Data

Mar. 30, 2022 (KR) .......................... 10-2022-0039953

(51) Int. Cl.
*H01M 50/269* (2021.01)
*H01M 50/211* (2021.01)
*H01M 50/547* (2021.01)

(52) U.S. Cl.
CPC ....... *H01M 50/269* (2021.01); *H01M 50/211* (2021.01); *H01M 50/547* (2021.01)

(58) Field of Classification Search
CPC . H01M 50/269; H01M 50/211; H01M 50/547
See application file for complete search history.

(56) References Cited

U.S. PATENT DOCUMENTS

| 347,068 A | * | 8/1886 | Sedgwick | ............... E05B 37/00 200/11 G |
| 367,219 A | * | 7/1887 | McCoy | .................... H04Q 3/00 379/182 |
| 3,864,172 A | | 2/1975 | Marks | |

(Continued)

FOREIGN PATENT DOCUMENTS

| AT | 513835 B1 | * | 8/2014 | ............. B65H 75/34 |
| CN | 101467523 A | * | 7/2009 | ....... A01K 89/01555 |

(Continued)

*Primary Examiner* — Kaity V Chandler
(74) *Attorney, Agent, or Firm* — Bryan Cave Leighton Paisner LLP (57) ABSTRACT

The present disclosure relates to a secondary battery module that is capable of being disposed inside a secondary battery pack in various forms and being easily set in series or parallel between cells inside the secondary battery pack, thereby improving efficiency in designing the secondary battery pack.

A secondary battery module according to the present disclosure includes: a plurality of cells comprising a first cell and a second cell which are facing each other, and a rotation member disposed between a surface of the first cell and a surface of the second cell facing the surface of the first cell, wherein the first cell is rotatable with respect to the second cell.

10 Claims, 10 Drawing Sheets

(56) References Cited

U.S. PATENT DOCUMENTS

| | | | |
|---|---|---|---|
| 2007/0020516 A1 | 1/2007 | Yoon | |
| 2010/0143771 A1 | 6/2010 | Jeong et al. | |
| 2012/0183831 A1 | 7/2012 | Jeong et al. | |
| 2016/0197332 A1* | 7/2016 | Lee | H01M 50/296 |
| | | | 429/159 |
| 2016/0204479 A1* | 7/2016 | Lee | H01M 50/503 |
| | | | 429/61 |
| 2018/0205053 A1 | 7/2018 | Ryu et al. | |
| 2019/0081294 A1 | 3/2019 | Capati et al. | |
| 2020/0388895 A1* | 12/2020 | Sheerin | H01M 12/06 |
| 2021/0060588 A1* | 3/2021 | Wootan | B05B 3/08 |
| 2022/0149473 A1 | 5/2022 | Wang et al. | |

FOREIGN PATENT DOCUMENTS

| | | | | |
|---|---|---|---|---|
| CN | 202944329 U | * | 5/2013 | ............ B60K 6/485 |
| CN | 104900931 A | | 9/2015 | |
| CN | 108140779 A | | 6/2018 | |
| CN | 108899958 A | * | 11/2018 | ............ H02J 7/0045 |
| CN | 109210414 A | * | 1/2019 | ............ F21S 6/002 |
| CN | 109494324 A | * | 3/2019 | ............ B60L 53/80 |
| CN | 110637383 A | * | 12/2019 | ............ B04B 7/00 |
| CN | 111183535 A | | 5/2020 | |
| CN | 112310526 A | * | 2/2021 | ............ H01M 10/04 |
| CN | 114649620 A | * | 6/2022 | ........ H01M 10/0525 |
| JP | 2001-035462 A | | 2/2001 | |
| JP | 2008544441 A | | 12/2008 | |
| JP | 2012-212534 A | | 11/2012 | |
| JP | 6149629 B2 | | 6/2017 | |
| JP | 6528792 B2 | | 6/2019 | |
| JP | 6693453 B2 | | 5/2020 | |
| KR | 10-2007-0011654 A | | 1/2007 | |
| KR | 10-0946579 B1 | | 3/2010 | |
| KR | 10-2010-0065779 A | | 6/2010 | |
| KR | 10-2012-0082164 A | | 7/2012 | |
| KR | 10-2016-0017150 A | | 2/2016 | |
| KR | 10-2016-0088002 A | | 7/2016 | |
| KR | 10-1797688 B1 | | 11/2017 | |
| KR | 10-2008740 B1 | | 8/2019 | |
| WO | WO-2008022997 A1 | * | 2/2008 | ......... B01F 13/0006 |
| WO | WO-2019069139 A1 | * | 4/2019 | ........ H01M 10/4214 |
| WO | WO-2020168835 A1 | * | 8/2020 | ............... F03G 5/02 |

\* cited by examiner

SECONDARY BATTERY MODULE

CROSS-REFERENCE TO RELATED APPLICATION

The present application is a National Phase entry pursuant to 35 U.S.C. § 371 of International Application No. PCT/KR2022/0017775, filed on Nov. 11, 2022, and claims the benefit of and priority to Korean Patent Application No. 10-2022-0039953, filed on Mar. 30, 2022, the entire contents of which are hereby incorporated by reference in their entirety.

TECHNICAL FIELD

The present disclosure relates to a secondary battery module, and more particularly, to a secondary battery module including a plurality of cells.

BACKGROUND

In recent years, the price of energy sources increases due to the depletion of fossil fuels, the interest in environmental pollution is amplified, and the demand for eco-friendly alternative energy sources is becoming an indispensable factor for future life. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile devices and electric vehicles using batteries increase, the demands for batteries as energy sources are rapidly increasing. Thus, many studies on batteries which are capable of meeting various demands have been conducted.

Batteries storing electrical energy may be generally classified into primary batteries and a secondary batteries. Such a primary battery is a disposable consumable battery. On the other hand, such a secondary battery is a chargeable battery that is manufactured by using a material in which oxidation and reduction processes between current and the material are capable of being repeated. That is, when the reduction reaction to the material is performed by the current, power is charged. When the oxidation reaction to the material is performed by the current, power is discharged. Such charging-discharging are repeatedly performed to generate electricity.

Recently, as the need for large-capacity structures in addition to the use as an energy storage source are increasing, demands for secondary battery packs in which a plurality of cells or secondary battery modules are aggregated is increasing, and thus, demands for secondary battery modules is also increasing.

A secondary battery module according to the related art has a fixed structure according to a frame for manufacturing a secondary battery pack. In addition, a direction and disposition of a terminal are fixed by arrangement, and a degree of freedom in design inside the secondary battery pack is limited.

In order to solve this problem, there is a need for a secondary battery module that is capable of being relatively freely designed inside the secondary battery pack and being applied in various forms.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

Technical Problem

The present disclosure has been made to solve the above problems, and an object of the present disclosure is to provide a secondary battery module that is capable of being disposed inside a secondary battery pack in various forms and being easily set in series or parallel between cells inside the secondary battery pack, thereby improving efficiency in designing the secondary battery pack.

Technical Solution

A secondary battery module according to the present disclosure may include: a plurality of cells including a first cell and a second cell which are facing each other; and a rotation member disposed between a surface of the first cell and a surface of the second cell facing the surface of the first cell, wherein the first cell is rotatable with respect to the second cell.

The secondary battery module may further include an adhesive material that attaches the rotation member to the first cell and the second cell.

The rotation member may include: a first rotation plate disposed at a center of the surface of the first cell; a second rotation plate disposed at a center of the surface of the second cell; and a rotation shaft connecting the first rotation plate to the second rotation plate so that the first rotation plate and the second rotation plate are rotatable with respect to each other and extending in a direction orthogonal to the surfaces of the plurality of cells.

The rotation shaft may have an elastic force that attracts the first rotation plate and the second rotation plate, which are spaced apart from each other.

The first rotation plate and the second rotation plate may include magnetic materials to be attracted to each other.

t rotation plate may include a protrusion protruding toward the second rotation plate, and the second rotation plate may include a recess that is recessed in a shape corresponding to that of the protrusion, wherein, when the second rotation plate rotates, the protrusion is inserted into the recess so that the first rotation plate and the second rotation plate are fixed to each other.

Each of the protrusion and the recess may be formed in two so that the first rotation plate and the second rotation plate are fixed to each other again when the first rotation plate or the second rotation plate rotates at an angle of 180 degrees in the state of being fixed to each other.

Each of the protrusion and the recess may be formed in four so that the first rotation plate and the second rotation plate are fixed to each other again when the first rotation plate or the second rotation plate rotates at an angle of 90 degrees in the state of being fixed to each other.

Each of the first cell and the second cell may further include: a first terminal disposed on an edge of one surface or the other surface of each of the first cell and the second cell; and a second terminal disposed on an edge opposite to the first terminal on the one surface or the other surface of each of the first cell and the second cell, wherein the first terminal may include: an upper first terminal protruding from the one surface of each of the first cell and the second cell to an adjacent cell facing the one surface of each of the first cell and the second cell; a lower first terminal disposed on the same plane as the one surface of each of the first cell and the second cell; and a symmetrical first terminal disposed at a position corresponding to the upper first terminal on the same plane of the other surface of each of the first cell and the second cell, and wherein the second terminal may include: an upper second terminal protruding from the other surface of each of the first cell and the second cell to a direction opposite to the one surface; a lower second terminal disposed on the same plane as the other surface of each of the first cell and the second cell; and a symmetrical second terminal disposed at a position corresponding to the upper second terminal on the same plane of the one surface of each of the first cell and the second cell, wherein the first terminal and the second terminal may have polarities opposite to each other and are coupled to each other at positions corresponding to each other to fix the first cell and the second cell.

In the first terminal and the second terminal: when the first cell is parallel to the second cell, the upper first terminal of the first cell and the symmetrical first terminal of the second cell may be in contact with each other, and the symmetrical second terminal of the first cell and the upper second terminal of the second cell may be in contact with each other so as to be connected in parallel, and when the first cell rotates at an angle of 180 degrees with respect to the second cell, the upper first terminal of the first cell and the lower second terminal of the second cell may be in contact with each other, and the lower first terminal of the first cell and the upper second terminal of the second cell may be in contact with each other so as to be connected in series.

A first terminal and a second terminal, which have polarities opposite to each other, may be provided on both ends of each of the plurality of cells, and wherein the secondary battery module may further include at least one of:

a parallel connection member configured to electrically connect the first terminals to each other and electrically connect the second terminals to each other; or a series connection member configured to electrically connect the first terminal to the second terminal.

Advantageous Effects

The secondary battery module according to the present disclosure may include the plurality of cells disposed to face each other and the rotation member which is disposed between the surface of the one cell and the surface of the other cell, which face each other in the plurality of cells, and in which the one cell rotates with respect to the other cell.

Therefore, the secondary battery module may be disposed inside the secondary battery pack in the various forms, and it may be easy to set in series or parallel between the cells inside the secondary battery pack, thereby improving the efficiency when designing the secondary battery pack.

DETAILED DESCRIPTION

Hereinafter, preferred embodiments of the present disclosure will be described in detail with reference to the accompanying drawings so that those of ordinary skill in the art can easily carry out the present disclosure. However, the present disclosure may be implemented in several different forms and is not limited or restricted by the following examples.

In order to clearly explain the present disclosure, detailed descriptions of portions that are irrelevant to the known technologies that may description or related unnecessarily obscure the gist of the present disclosure have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain his or her invention in the best ways.

Figure 1:
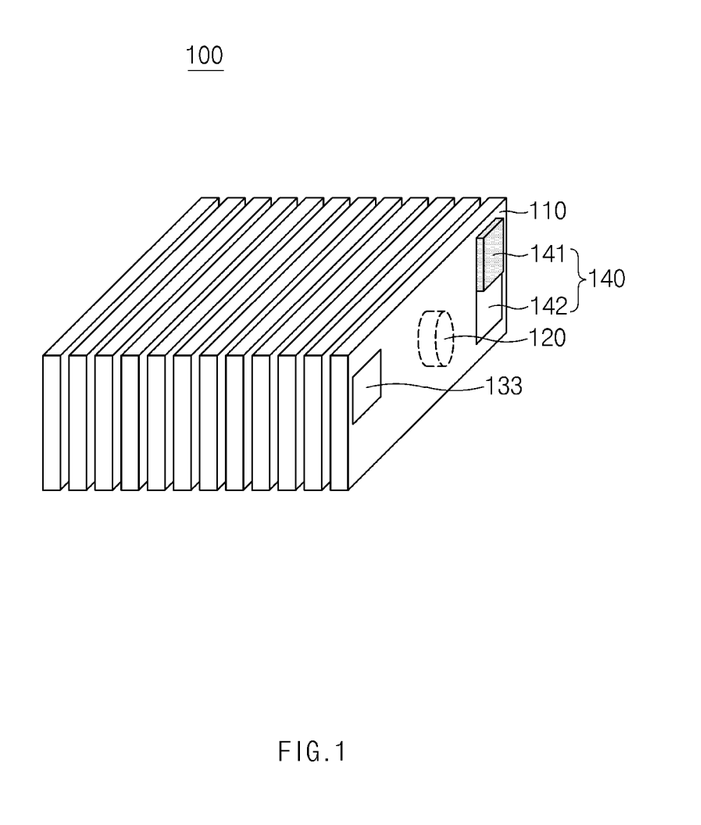
FIG. 1 is a schematic perspective view illustrating a secondary battery module according to Embodiment 1 of the present disclosure.
Figure 2:
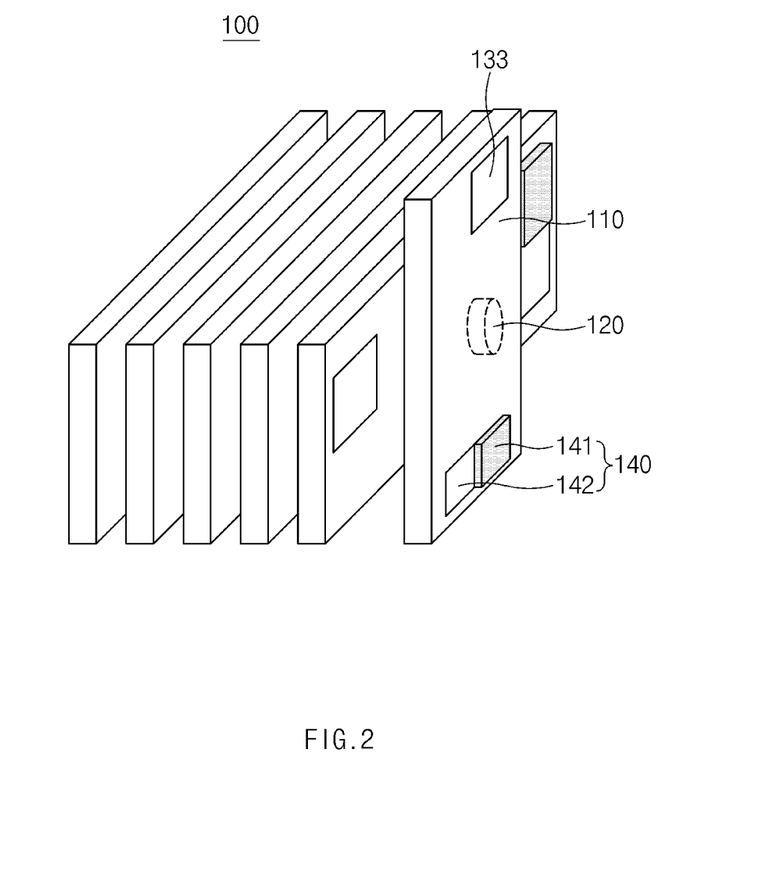
FIG. 2 is a schematic perspective view illustrating a state in which a cell of the secondary battery module rotates according to Embodiment 1 of the present disclosure.

FIG. 1 is a schematic perspective view illustrating a secondary battery module 100 according to Embodiment 1 of the present disclosure, and FIG. 2 is a schematic perspective view illustrating a state in which a cell 110 of the secondary battery module 100 rotates according to Embodiment 1 of the present disclosure.

The present disclosure provides a secondary battery module 100 as Embodiment 1.

The secondary battery module 100 according to Embodiment 1 of the present disclosure may include a cell 110 and a rotation member 120.

Referring to FIG. 1, the cell 110 of the secondary battery module 100 may be provided in plurality to face each other. Here, the cell 110 may mean a pouch cell.

The cells 110 may be disposed parallel to each other, and the secondary battery module 100 according to Embodiment 1 may include 12 cells 110.

The rotation member 120 of the secondary battery module 100 may be disposed between a surface of one cell 110a (see FIG. 6) and a surface of the other cell 110b, which face each other, in the plurality of cells 110. Here, the one cell 110a may rotate with respect to the other cell 110b. The one cell 110a may not mean a specific cell, but may mean any cell of the plurality of cells 110. In addition, the other cell 110b may mean a cell adjacent to the one cell 110a.

FIG. 2 illustrates a state in which the one cell 110 disposed on the outside rotates at an angle of approximately 90 degrees. Referring to FIG. 2, each of the cells 110 may rotate with respect to the other cell 110 by a rotation member 120. Here, the cell 110 may rotate at an angle of 360 degrees.

The state in which the cells 110 are disposed in the secondary battery module 100 may be efficiently changed by the rotation member 120.

The secondary battery module 100 according to Embodiment 1 of the present disclosure may further include an adhesive material (not shown). The rotation member 120, more specifically, rotation plates 121 and 122 (see FIG. 3) to be described later may be attached to the cell 110 by the adhesive material.

Specifically, the adhesive material may be applied to a portion of the surface of the cell 110 on which the rotation member 120 is disposed.

The cell 110 of the secondary battery module 100 and the rotation member 120 may be attached to each other and efficiently fixed by the adhesive material.

Figure 3:
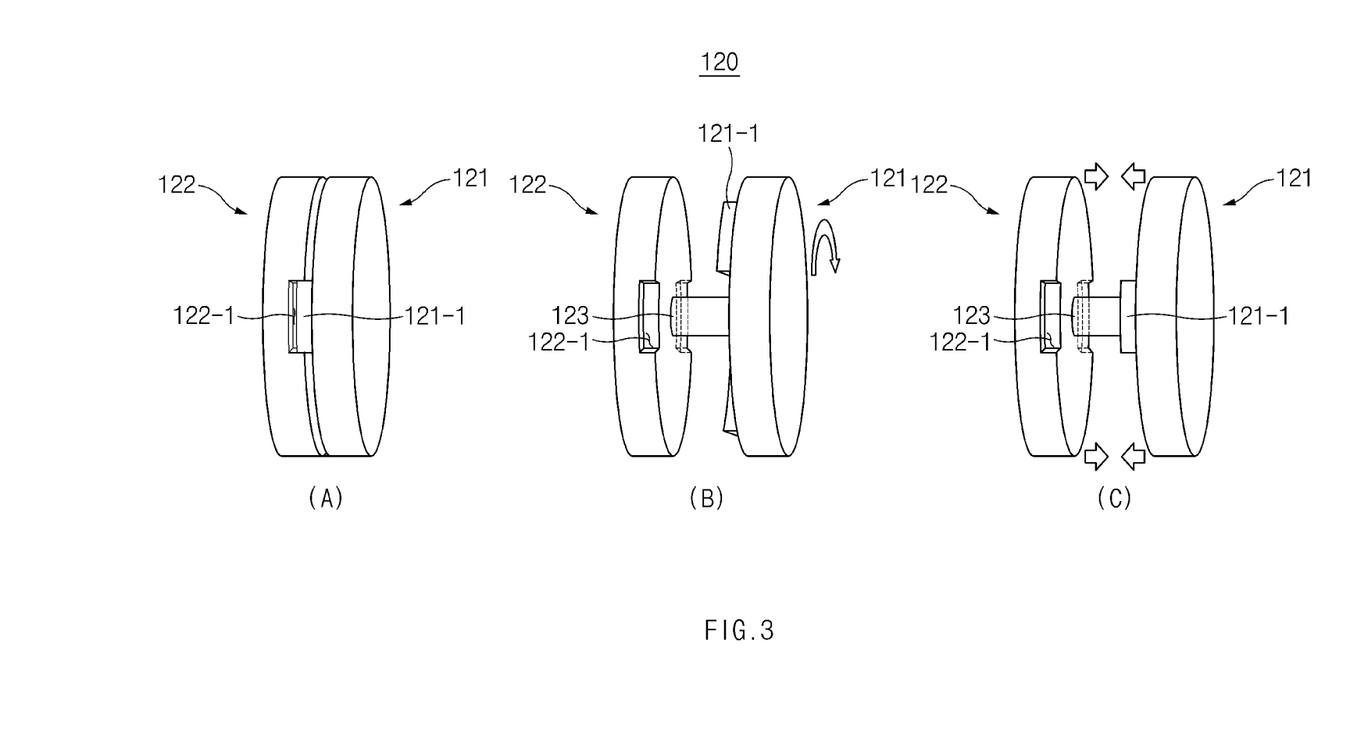
FIG. 3 is a schematic perspective view illustrating a rotation member of the secondary battery module according to Embodiment 1 of the present disclosure.

FIG. 3 is a schematic perspective view illustrating the rotation member 120 of the secondary battery module 100 according to Embodiment 1 of the present disclosure.

Specifically, (A) of FIG. 3 schematically illustrates a state in which the first rotation plate 121 and the second rotation plate 122 are in contact with each other, and (B) of FIG. 3 schematically illustrates a state in which the first rotation plate 121 rotates in a state of being spaced apart from the second rotation plate 122, and (C) of FIG. 3 schematically illustrates a state in which the first rotation plate 121, which has rotated, and the second rotation plate 122 are attracted to each other.

The rotation member 120 of the secondary battery module 100 according to Embodiment 1 of the present disclosure may include the first rotation plate 121, the second rotation plate 122, and a rotation shaft 123.

The first rotation plate 121 may be disposed at a center of the surface of one cell 110a, and the second rotation plate 122 may be disposed at a center of the surface of the other cell 110b.

Referring to FIG. 3, each of the first rotation plate 121 and the second rotation plate 122 may be formed in a substantially disk shape, and the first rotation plate 121 and the second rotation plate 122 may have substantially the same cross-sectional area. However, the shape and area of each of the rotation plates 121 and 122 are not limited thereto.

The rotation shaft 123 may connect the first rotation plate 121 to the second rotation plate 122 to be rotatable with each other and may extend in a direction orthogonal to the surfaces of the plurality of cells 110.

Specifically, the rotation shaft 123 may be formed in a substantially shaft shape and may have a cross-sectional area smaller than the cross-sectional area of each of the first rotation plate 121 and the second rotation plate 122.

In addition, the rotation shaft 123 according to Embodiment 1 may be disposed at a center of the surface of the first rotation plate 121 or the second rotation plate 122. The first rotation plate 121 or the second rotation plate 122 may rotate around a rotation axis 123, and the cells 110 may rotate together by the rotation of the first rotation plate 121 or the second rotation plate 122.

Each of the cells 110 may efficiently rotate by components included in the rotation member 120.

The rotation shaft 123 of the rotation member 120 according to Embodiment 1 of the present disclosure may have elasticity. Specifically, the rotation shaft 123 may be made of a material having elasticity.

The rotation shaft 123 may attract the first rotation plate 121 and the second rotation plate 122 spaced apart from each other by elastic force. The first rotation plate 121 or the second rotation plate 122 may rotate while being spaced apart from each other. The elastic force may act on the first rotation plate 121 and the second rotation plate 122, which are spaced apart from each other, in a mutually attracting direction by the rotation shaft 123. That is, attracting force may be provided so that the first rotation plate 121 and the second rotation plate 122 rotating at a desired angle are in contact with each other through the elastic force of the rotation shaft 123.

If the rotation shaft 123 has the elasticity, after the rotation, the first rotation plate 121 or the second rotation plate 122 may efficiently move to be in contact with each other.

The first rotation plate 121 of the rotation member 120 according to Embodiment 1 of the present disclosure may include a protrusion 121-1, and the second rotation plate 122 may have a recess 122-1.

The protrusion 121-1 may be formed to protrude from one surface of the first rotation plate 121 toward the second rotation plate 122, and the recess 122-1 may be formed to be recessed in a shape corresponding to that of the protrusion 121-1 in one surface of the second rotation plate 122.

Since the protrusion 121-1 is inserted into the recess 122-1, the first rotation plate 121 and the second rotation plate 122 may be efficiently fixed to each other.

The protrusion 121-1 according to Embodiment 1 may have a substantially rectangular parallelepiped shape so as to be easily fixed in the state of being inserted into the recess 122-1.

Each of the protrusion 121-1 and the recess 122-1 may be provided in plurality. The plurality of protrusions 121-1 may be spaced apart from each other at a certain angle in a circumferential direction of the first rotation plate 121, and the plurality of recesses 122-1 may be spaced apart from each other at a certain angle in a circumferential direction of the second rotation plate 122.

The angle at which the plurality of protrusions 121-1 are spaced apart from each other may be the same as the angle at which the plurality of recesses 122-1 are spaced apart from each other. Thus, whenever the first rotation plate 121 and the second rotation plate 122 rotate with respect to each other at the above angles, the first rotation plate 121 and the second rotation plate 122 may be fixed to each other again.

For example, two protrusions 121-1 and two recesses 122-1 according to Embodiment 1 of the present disclosure may be formed.

Referring to FIG. 3, the protrusions 121-1 may be formed on an edge of the first rotation plate 121, and the two protrusions 121-1 may be disposed in a line that may be a diameter of one surface of the first rotation plate 121 having a substantially circular shape. That is, the two protrusions 121-1 may be spaced apart from each other at an angle of 180 degrees.

Similarly, the recesses 122-1 may be formed at both ends of the second rotation plate 122, and the two recesses 122-1 may be disposed in a line that may be a diameter of one surface of the second rotation plate 122 having a substantially circular shape. That is, the two recesses 122-1 may be spaced apart from each other at an angle of 180 degrees.

Since the two protrusions 121-1 and the two recesses 122-1 formed at positions corresponding to each other are formed, when the first rotation plate 121 or the second rotation plate 122 rotates at an angle of 180 degrees in the state of being fixed to each other, the first rotation plate 121 or the second rotation plate 122 may be fixed to each other again.

Therefore, the first rotation plate 121 or the second rotation plate 122 may be efficiently fixed to each other even when rotating at an angle of 180 degrees.

Figure 4:
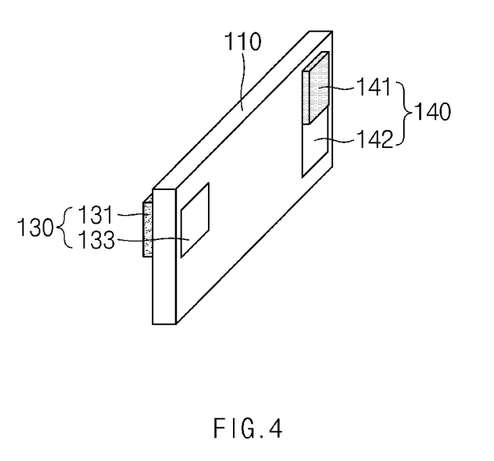
FIG. 4 is a schematic perspective view illustrating a cell, a first terminal, and a second terminal of the secondary battery module according to Embodiment 1 of the present disclosure.
Figure 5:
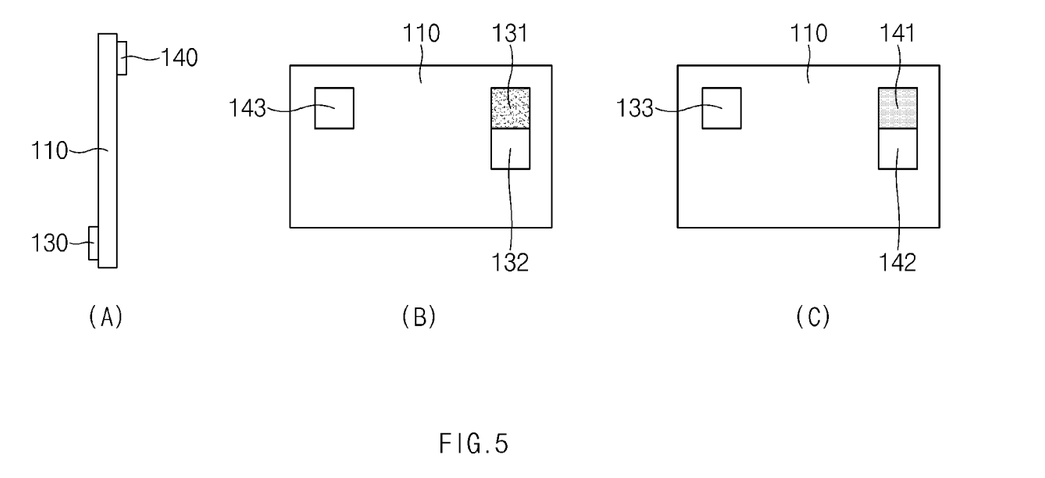
FIG. 5 is a schematic view illustrating a state in which the first terminal and the second terminal are disposed on the cell of the secondary battery module according to Embodiment 1 of the present disclosure.

FIG. 4 is a schematic perspective view illustrating the cell 110, a first terminal 130, and a second terminal 140 of the secondary battery module 100 according to Embodiment 1 of the present disclosure, and FIG. 5 is a schematic view illustrating a state in which the first terminal 130 and the second terminal 140 are disposed on the cell 110 of the secondary battery module 100 according to Embodiment 1 of the present disclosure.

Specifically, (A) of FIG. 5 schematically illustrates the cell 110 of FIG. 4 when viewed from above, (B) of FIG. 5 schematically illustrates the cell 110 of FIG. 4 when viewed from a left side in FIG. 4, and (C) of FIG. 5 schematically illustrates the cell 110 of FIG. 4 when viewed from a right side in FIG. 4.

The secondary battery module 100 according to Embodiment 1 of the present disclosure may further include the first terminal 130 and the second terminal 140.

Referring to FIG. 4, the first terminal 130 and the second terminal 140 may be disposed on both sides of one surface or the other surface of the cell 110.

Here, the first terminal 130 and the second terminal 140 may have opposite polarities.

The first terminal 130 may include an upper first terminal 131, a lower first terminal 132, and a symmetrical first terminal 133, and the second terminal 140 may include an upper second terminal 141, a lower second terminal 142 and a symmetrical second terminal 143.

Referring to FIG. 5, the upper first terminal 131 may be disposed to protrude toward the other cell 110 disposed to face the one surface of the cell 110, and the lower first terminal 132 may be disposed on the same plane on the one surface of the cell 110. Here, the lower first terminal 132 may be disposed below the upper first terminal 131.

The symmetrical first terminal 133 may be disposed on the same plane on the other surface opposite to the one side of the cell 110. Here, the symmetrical first terminal 133 may be disposed at a position on the other surface corresponding to the upper first terminal 131 on the one surface.

Referring to FIG. 5, the upper second terminal 141 may be disposed to protrude toward the other cell 110 disposed to face the other surface of the cell 110, and the lower second terminal 142 may be disposed on the same plane on the other surface of the cell 110. Here, the lower second terminal 142 may be disposed below the upper second terminal 141.

The symmetrical second terminal 143 may be disposed on the same plane on one surface opposite to the other surface of the cell 110. Here, the symmetrical second terminal 143 may be disposed at a position on one surface corresponding to the upper second terminal 141 on the other surface.

Figure 6:
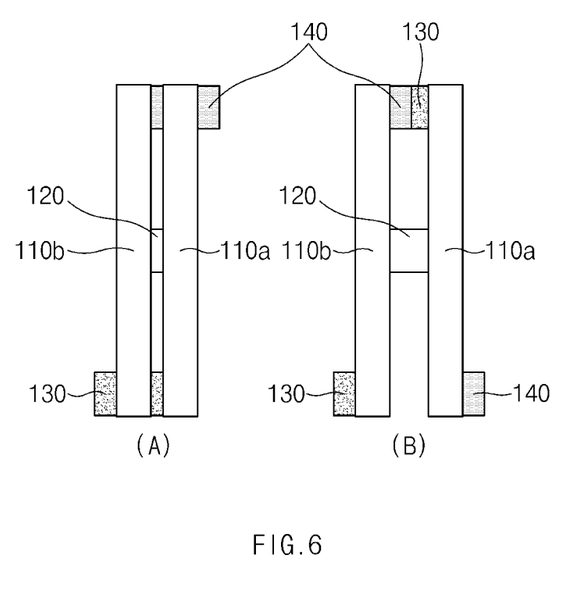
FIG. 6 is a schematic view illustrating a state in which the cells are connected to each other by the first terminal and the second terminal of the secondary battery module according to Embodiment 1 of the present disclosure.

FIG. 6 is a schematic view illustrating a state in which the cells 110 are connected to each other by the first terminal 130 and the second terminal 140 of the secondary battery module 100 according to Embodiment 1 of the present Specifically, (A) of FIG. 6 schematically illustrates a state in which one cell 110a and the other cell 110b are connected in parallel to each other, and (B) of FIG. 6 schematically illustrates a state in which one cell 110a and the other cell 110b are connected in series to each other.

The first terminal 130 and the second terminal 140 of the secondary battery module 100 according to Embodiment 1 of the present disclosure may have opposite polarities and may be electrically connected through contact therebetween.

Referring to (A) of FIG. 6, the upper first terminal 131 of the one cell 110a and the symmetrical first terminal 133 of the other cell 110b are in contact with each other, and the symmetrical second terminal 143 of the one cell 110a and the upper second terminal 141 of the other cell 110b are in contact with each other so as to be connected in parallel. In this case, the one cell 110a and the other cell 110b may be parallel to each other.

Specifically, the upper first terminal 131 of the one cell 110a may protrude to be in contact with the symmetrical first terminal 133 of the other cell 110b at a corresponding position, and the upper second terminal 141 of the other cell 110b may protrude to be in contact with the symmetrical second terminal 143 of the one cell 110a at a corresponding position.

In addition, the one cell 110a may be connected in series to the other cell 110b in a state of rotating at an angle of 180 degrees.

Referring to (B) of FIG. 6, when the one cell 110a rotates at an angle of 180 degrees with respect to the other cell 110b, the upper first terminal 131 of the one cell 110a and the lower second terminal of the other cell 110b may be in contact with each other, and the lower first terminal 132 of the one cell 110a and the upper second terminal 141 of the other cell 110b may be in contact with each other so as to be connected in series.

Specifically, the upper first terminal 131 of the one cell 110a rotating at an angle of 180 degrees may protrude to be in contact with the lower second terminal 142 of the other cell 110b at a corresponding position, and the upper second terminal 141 of the one cell 110b may protrude to be in contact with the lower first terminal 132 of the one cell 110a, which has rotated, at a corresponding position.

The secondary battery module 100 may efficiently set the cells 110 by connecting the cells 110 in series or parallel by the components included in the first terminal 130 and the components included in the second terminal 140, and thus, efficiency may be improved when designing the secondary battery pack.

Figure 7:
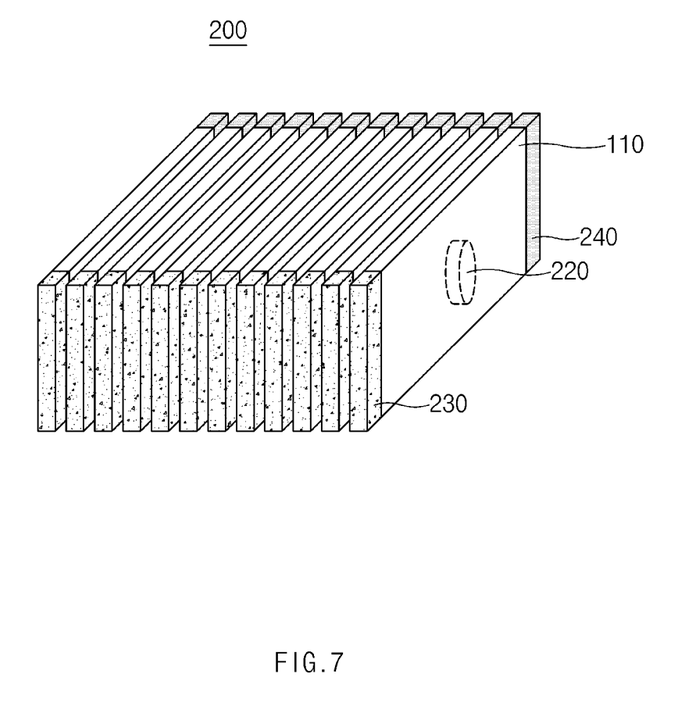
FIG. 7 is a schematic perspective view illustrating a secondary battery module according to Embodiment 2 of the present disclosure.
Figure 8:
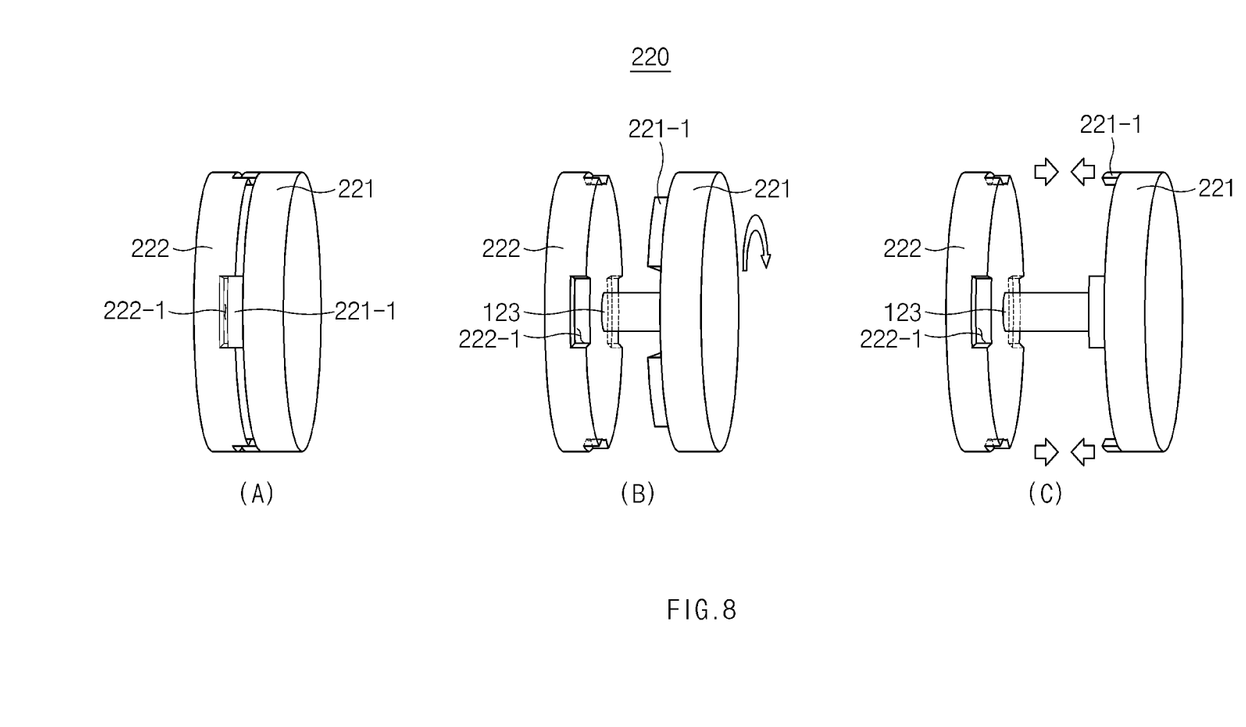
FIG. 8 is a schematic perspective view illustrating a rotation member of the secondary battery module according to Embodiment 2 of the present disclosure.

FIG. 7 is a schematic perspective view illustrating a secondary battery module 200 according to Embodiment 2 of the present disclosure, and FIG. 8 is a schematic perspective view illustrating a rotation member 220 of the secondary battery module 200 according to Embodiment 2 of the present disclosure.

Specifically, (A) of FIG. 8 schematically illustrates a state in which the first rotation plate 221 and the second rotation plate 222 are in contact with each other, and (B) of FIG. 8 schematically illustrates a state in which the first rotation plate 221 rotates in a state of being spaced apart from the second rotation plate 222, and (C) of FIG. 8 schematically illustrates a state in which the first rotation plate 221, which has rotated, and the second rotation plate 222 are attracted to each other.

The present disclosure provides the secondary battery module 200 having a different type as Embodiment 2.

Hereinafter, a detailed description of the same configuration as that of the secondary battery module 100 according to Embodiment 1 of the present disclosure will be omitted.

Referring to FIG. 7, the secondary battery module 200 according to Embodiment 2 of the present disclosure may include a cell 110, a rotation member 220, a first terminal 230, and a second terminal 240.

The rotation member 220 may include a first rotation plate 221 and a second rotation plate 222. In addition, the first rotation plate 221 may include a protrusion 221-1, and the second rotation plate 222 may have a recess 222-1.

Referring to FIG. 8, each of the first rotation plate 221 and the second rotation plate 222 may be formed in a substantially disk shape, and the first rotation plate 221 and the second rotation plate 222 may have substantially the same cross-sectional area. However, the shape and area of each of the rotation plates 221 and 222 are not limited thereto.

Four protrusions 221-1 and four recesses 222-1 according to Embodiment 2 of the present disclosure may be formed. The plurality of protrusions 221-1 may be spaced apart from each other at an angle of 90 degrees in a circumferential direction of the first rotation plate 221, and the plurality of recesses 222-1 may be spaced apart from each other at an angle of 90 degrees in a circumferential direction of the second rotation plate 222.

Referring to FIG. 8, the protrusions 221-1 may be formed on four edges of the first rotation plate 221, and the four protrusions 221-1 may be disposed in a line that may be a diameter of one surface of the first rotation plate 221 having a substantially circular shape and a line that may be a different diameter perpendicular to the diameter.

Similarly, the recesses 222-1 may be formed at four edges of the second rotation plate 222, and the four recesses 222-1 may be disposed in a line that may be a diameter of one surface of the second rotation plate 222 having a substantially circular shape and a line that may be a different diameter perpendicular to the diameter.

Since the four protrusions 221-1 and the four recesses 222-1 formed at positions corresponding to each other are formed, whenever the first rotation plate 221 or the second rotation plate 222 rotates at an angle of 90 degrees in the state of being fixed to each other, the first rotation plate 221 or the second rotation plate 222 may be fixed to each other again.

Therefore, the first rotation plate 221 or the second rotation plate 222 may be efficiently fixed to each other even when rotating at angles of 90 degrees, 180 degrees, and 270 degrees.

Each of the first rotation plate 221 and the second rotation plate 222 according to Embodiment 2 of the present disclosure may include a magnetic material.

Force that attracts the first and second rotation plates 221 and 222 spaced apart from each other by magnetism may be applied to the first rotation plate 221 and the second rotation plate 222.

The first rotation plate 221 or the second rotation plate 222 may be spaced apart from each other by a rotation shaft 123 of which a length is adjustable and may rotate in the state of being spaced apart from each other. Here, the magnetic force may be applied to the first rotation plate 221 and the second rotation plate 222 in the state of being spaced apart from each other in a direction in which the first rotation plate 221 and the second rotation plate 222 are attracted to each other by the magnetism. That is, attracting force may be provided so that the first rotation plate 221 and the second rotation plate 222 rotating at a desired angle are in contact with each other through the magnetic force.

If each of the first rotation plate 221 and the second rotation plate 222 includes the magnetic material, the first rotation plate 221 and the second rotation plate 222 may move so that the first rotation plate 221 or the second rotation plate 222 are in contact with each other again after the rotation.

Figure 9:
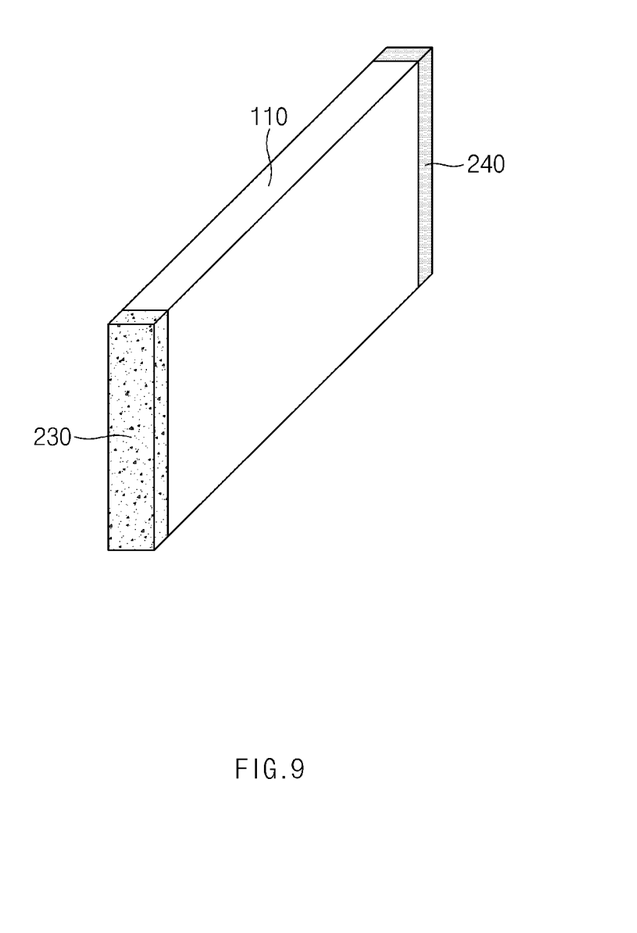
FIG. 9 is a schematic perspective view illustrating a cell, a first terminal, and a second terminal of the secondary battery module according to Embodiment 2 of the present disclosure.
Figure 10:
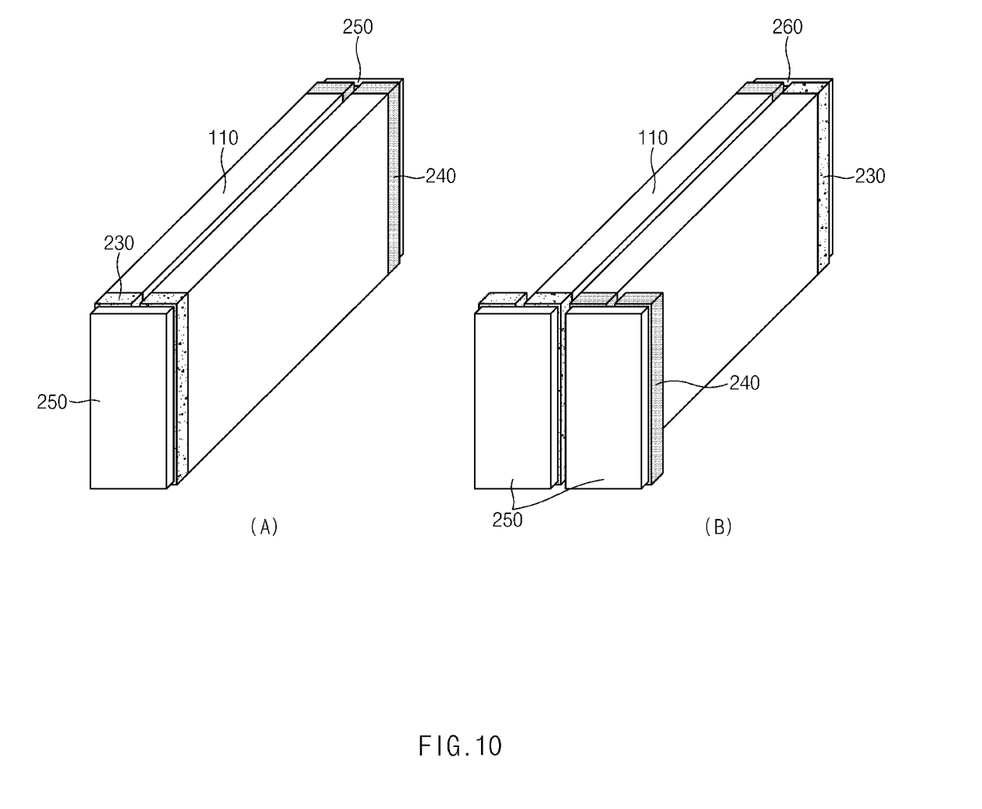
FIG. 10 is a schematic perspective view illustrating a state in which a parallel connection member and a series connection member are disposed according to Embodiment 2 of the present disclosure.

FIG. 9 is a schematic perspective view illustrating the cell 110, the first terminal 230, and the second terminal 240 of the secondary battery module 200 according to Embodiment 2 of the present disclosure, and FIG. 10 is a schematic perspective view illustrating a state in which a parallel connection member 250 and a series connection member 260 are disposed according to Embodiment 2 of the present disclosure.

Specifically, (A) of FIG. 10 schematically illustrates a state in which two cells 110 are connected in parallel to each other, and (B) of FIG. 10 schematically illustrates a state in which two cells 110 are connected in series to each other.

Referring to FIG. 9, the first terminal 230 and the second terminal 240 of the secondary battery module 200 may have opposite polarities and may be provided at both ends of the plurality of cells 110, respectively. Here, a size of each of the first terminal 230 and the second terminal 240 may vary depending on a shape of the secondary battery module 200.

Since the secondary battery module 200 according to Embodiment 2 of the present disclosure includes the rotation member 220 disposed between the cells 110, the cells 110 may disposed to be spaced apart from each other. In addition, the first terminal 230 and the second terminal 240 provided in each cell 110 may also be disposed to be spaced apart from each other and may not in contact with each other. Therefore, the secondary battery module 200 requires an additional component capable of connecting the first terminal 230 and the second terminal 240 to each other.

As an example of the component capable of electrically connecting the first terminal 230 and the second terminal 240 to each other, the secondary battery module 200 according to Embodiment 2 of the present disclosure may further include at least one of a parallel connection member 250 or a series connection member 260.

The parallel connection member 250 may electrically connect the first terminals 230 to each other or electrically connect the second terminals 240 to each other, and the series connection member 260 may electrically connect the first terminal 230 and the second terminal 240 to each other.

Referring to FIG. 10, the parallel connection member 250 and the series connection member 260 may be disposed at opposite sides of the cell 110 based on the first terminal 230 or the second terminal 240, which are disposed at both ends of the cell 110.

The parallel connection members 250 may have different shapes according to the number of terminals having the same polarity connected to each other.

The secondary battery module 200 according to Embodiment 2 of the present disclosure may include the parallel connection member 250 and the series connection member 260 so as to be efficiently set by serial connection or parallel connection.

The secondary battery module 100 according to Embodiment 1 of the present disclosure and the secondary battery module 200 according to Embodiment 2 of the present disclosure may be easily set in series or parallel for the electrical connection between the cells 110 inside the secondary battery pack, thereby improving efficiency when the second battery pack is designed.

In this regard, an example for the electrical setting between the cells 110 is briefly described as follows.

The secondary battery modules 100 and 200 including 12 cells 110 may be easily changed into a form in which the 12 cells 110 are connected in series, or six pairs of two cells 110 connected in parallel are connected in series. In addition, a form in which four pairs of three cells 110 connected in parallel are connected in series, or a form in which three pairs of four cells 110 connected in parallel are connected in series may also be easily implemented.

Therefore, the secondary battery modules 100 and 200 of the present disclosure may be easily designed in various forms to be disposed inside the secondary battery pack.

While the embodiments of the present disclosure have been described with reference to the specific embodiments, it will be apparent to those skilled in the art that various changes and modifications may be made without departing from the spirit and scope of the invention as defined in the following claims.

DESCRIPTION OF THE SYMBOLS 100, 200: Secondary battery module
110, 110a, 110b: Cell
120, 220: Rotation member
121, 221: First rotation plate
121-1, 221-1: Protrusion
122, 222: Second rotation plate
122-1, 222-1: Recess
123: Rotation shaft
130, 230: First terminal
131: Upper first terminal
132: Lower first terminal
133: Symmetrical first terminal
140, 240: Second terminal
141: Upper second terminal
142: Lower second terminal
143: Symmetrical second terminal
250: Parallel connection member
260: Series connection member

The invention claimed is:

1. A secondary battery module, comprising:
a plurality of cells comprising a first cell and a second cell which are facing each other; and
a rotation member disposed between a surface of the first cell and a surface of the second cell facing the surface of the first cell,
wherein the first cell is rotatable with respect to the second cell,
wherein the rotation member comprises:
a first rotation plate disposed at a center of the surface of the first cell;
a second rotation plate disposed at a center of the surface of the second cell; and
a rotation shaft connecting the first rotation plate to the second rotation plate so that the first rotation plate and the second rotation plate are rotatable with respect to each other and extending in a direction orthogonal to the surfaces of the plurality of cells, and
wherein the first rotation plate and the second rotation plate are attracted to each other.

2. The secondary battery module of claim 1, further comprising:
an adhesive material that attaches the rotation member to the first cell and the second cell.

3. The secondary battery module of claim 1, wherein the rotation shaft has an elastic force that attracts the first rotation plate and the second rotation plate, which are spaced apart from each other.

4. The secondary battery module of claim 1, wherein the first rotation plate and the second rotation plate comprise magnetic materials to be attracted to each other.

5. The secondary battery module of claim 1, wherein:
the first rotation plate comprises a protrusion protruding toward the second rotation plate, and
the second rotation plate comprises a recess that is recessed in a shape corresponding to that of the protrusion,
wherein, when the second rotation plate rotates, the protrusion is inserted into the recess so that the first rotation plate and the second rotation plate are fixed to each other.

6. The secondary battery module of claim 5, wherein each of the protrusion and the recess is formed in two so that the first rotation plate and the second rotation plate are fixed to each other again when the first rotation plate or the second rotation plate rotates at an angle of 180 degrees in the state of being fixed to each other.

7. The secondary battery module of claim 5, wherein each of the protrusion and the recess is formed in four so that the first rotation plate and the second rotation plate are fixed to each other again when the first rotation plate or the second rotation plate rotates at an angle of 90 degrees in the state of being fixed to each other.

8. The secondary battery module of claim 1, wherein each of the first cell and the second cell further comprises:
a first terminal disposed on an edge of one surface or the other surface of each of the first cell and the second cell; and
a second terminal disposed on an edge opposite to the first terminal on the one surface or the other surface of each of the first cell and the second cell,
wherein the first terminal comprises:
an upper first terminal the protruding from the one surface of each of the first cell and the second cell to an adjacent cell facing the one surface of each of the first cell and the second cell:
a lower first terminal disposed on the same plane as the one surface of each of the first cell and the second cell; and
a symmetrical first terminal disposed at a position corresponding to the upper first terminal on the same plane of the other surface of each of the first cell and the second cell, and
wherein the second terminal comprises:
an upper second terminal the protruding from the other surface of each of the first cell and the second cell to a direction opposite to the one surface;
a lower second terminal disposed on the same plane as the other surface of each of the first cell and the second cell; and
a symmetrical second terminal disposed at a position corresponding to the upper second terminal on the same plane of the one surface of each of the first cell and the second cell,
wherein the first terminal and the second terminal have polarities opposite to each other and are coupled to each other at positions corresponding to each other to fix the first cell and the second cell.

9. The secondary battery module of claim 8, wherein, in the first terminal and the second terminal:
when the first cell is parallel to the second cell, the upper first terminal of the first cell and the symmetrical first terminal of the second cell are in contact with each other, and the symmetrical second terminal of the first cell and the upper second terminal of the second cell are in contact with each other so as to be connected in parallel, and when the first cell rotates at an angle of 180 degrees with respect to the second cell, the upper first terminal of the first cell and the lower second terminal of the second cell are in contact with each other, and the lower first terminal of the first cell and the upper second terminal of the second cell are in contact with each other so as to be connected in series.

10. The secondary battery module of claim 1, wherein a first terminal and a second terminal, which have polarities opposite to each other, are provided on both ends of each of the plurality of cells, and wherein the secondary battery module further comprises at least one of:

a parallel connection member that electrically connects the first terminals to each other and electrically connects the second terminals to each other; or a series connection member that electrically connects the first terminal to the second terminal.

\* \* \* \* \*